United States Patent [19]

Bunkley et al.

[11] 4,031,053

[45] June 21, 1977

[54] PROTECTIVE COLLOIDS FROM ALCOHOLYSIS PRODUCTS OF POLYALCOHOLS AND POLYACRYLATE ESTERS

[75] Inventors: Rex L. Bunkley, Kingsville, Tex.; Thomas M. Powanda, Middlesex, N.J.

[73] Assignee: Celanese Corporation, New York, N.Y.

[22] Filed: Feb. 5, 1976

[21] Appl. No.: 655,581

[52] U.S. Cl. .................. 260/29.6 RW; 260/29.6 H; 260/29.6 WB
[51] Int. Cl.² .......................................... C08L 31/04
[58] Field of Search ............ 260/29.6 RW, 29.6 H, 260/29.6 WB, 29.7 UP, 486 R; 526/320

[56] References Cited

UNITED STATES PATENTS

| | | | |
|---|---|---|---|
| 3,210,327 | 10/1965 | Galiano et al. | 260/486 R |
| 3,686,268 | 8/1972 | Jobert et al. | 260/486 R |
| 3,758,448 | 9/1973 | Stamberger | 260/29.6 H |
| 3,836,576 | 9/1974 | Falize et al. | 260/486 R |
| 3,876,596 | 4/1975 | Grubert et al. | 260/29.6 H |
| 3,957,711 | 5/1976 | Powanda et al. | 260/29.6 RW |

*Primary Examiner*—M. J. Welsh

[57] ABSTRACT

Aqueous dispersions of synthetic polymers have been made by polymerizing ethylenically unsaturated monomers in water in the presence of a protective colloid prepared by copolymerizing the alcoholysis product of a mixture of about 1 to about 3 mols of a di-, tri-, or tetra- polyol and about 1 mole of a tri- or a tetra- acrylate ester. Such aqueous dispersions are useful in paints, adhesives and textile applications, and exhibit improvements in wet adhesion and abrasion resistance.

11 Claims, No Drawings

PROTECTIVE COLLOIDS FROM ALCOHOLYSIS PRODUCTS OF POLYALCOHOLS AND POLYACRYLATE ESTERS

BACKGROUND OF INVENTION

The field of art to which this invention pertains is aqueous dispersions of synthetic polymers, particularly aqueous dispersions of synthetic polymers prepared by polymerizing ethylenically unsaturated monomers in water in the presence of a protective colloid.

The use of protective colloids as stabilizers for aqueous dispersions and emulsions is well known in the art. Protective colloids are water-soluble materials which form colloidal solutions. Such materials include starch, casein, glue, shellac, polyvinyl alcohol, sodium polyacrylate, methylcellulose, hydroxyethyl cellulose and the like. U.S. Pat. No. 2,998,400 sets forth a number of protective colloids which have been used in aqueous polymer dispersion preparations among which are polyacrylic acid, saccharide of polygalacturonic acid, gum arabic, hydroxyethyl cellulose, gelatine, citrus, pectin, starch, sulfonated-carboxylated starch, polyvinyl alcohol, sodium carboxymethyl cellulose, propylene glycol alginate gum tragacanth, polyacrylamide, and vinyl methyl ether-maleic anhydride copolymer and its half amide. The use of polyacrylic acid as a protective colloid is described in U.S. Pat. No. 2,671,065. Hydroxyalkyl galactomannans as protective colloids are described in U.S. Pat. No. 3,551,366.

U.S. Pat. No. 3,700,624 discloses the use of certain polyacrylate esters in an emulsion polymerization. However, the polyacrylate esters are not utilized following a transesterification of alcoholysis reaction, and no free hydroxyl groups are disclosed as being present in the product added to the emulsion. Finally, the product disclosed in this patent is added in its monomeric, rather than polymeric, form. U.S. Pat. No. 3,957,711 discloses the use of hydroxyacrylates or methacrylates as protective colloids. However, the emulsions of the instant invention exhibit improved adhesion and abrasion resistance properties, compared to these prior art emulsions.

SUMMARY OF INVENTION

This invention pertains to aqueous synthetic polymer dispersions stabilized with a protective colloid. In particular, this invention relates to aqueous synthetic polymer dispersions wherein the protective colloid is formed by alcoholizing utilizing a di-, tri-, or tetra-alcohol, and a tri- or tetra- acrylate ester of a tri- or tetrahydroxy polyol and copolymerizing the resulting product. More particularly, this invention pertains to a process for preparing aqueous synthetic polymer dispersions wherein the alcoholysis product is formed into a protective colloid in situ.

By practicing the process of this invention the particle size and solids content of aqueous synthetic polymer dispersions can be varied within wide limits. Dispersions having thixotropic, Newtonian or dilatant flow properties can be made. Polymers can be prepared which have excellent heat stability. By controlling the molecular weight of the alcoholysis product, aqueous dispersions of identical formulation can be made at various viscosities. These aqueous dispersions can be made into paints which have excellent flow and leveling properties.

In addition, the dispersions prepared according to the instant invention exhibit improvements in wet adhesion, i.e., the adhesion of the cured film to a substrate which is subject to constant wetting. These films also demonstrate improved abrasion resistance.

The aqueous dispersions made by the process of this invention are useful in the manufacture of paints and coatings, in the formulation of adhesives, and in textile applications.

DESCRIPTION OF INVENTION

Monomers useful in the process of this invention are polymerizable ethylenically unsaturated compounds which can be homo- or copolymerized, depending upon the properties desired in the final product. Examples of such monomers can be found in the following classes:

A. Vinyl esters of alkanoic acids;
B. Esters of unsaturated mono- and polycarboxylic acids;
D. Unsaturated nitriles;
E. Unsaturated amides;
F. Vinyl aromatics;
G. Alkenes; and
H. Alkadienes.

Examples of class A monomers are vinyl esters or organic acids having 2 to 18 carbon atoms. Examples of such esters include vinyl acetate, vinyl propinate, vinyl butyrate, vinyl benzoate, vinyl 2-ethyl-hexoate and vinyl stearate.

Examples of class B monomers are esters of polymerizable unsaturated mono- and polycarboxylic acids wherein the ester group contains 1 to 18 carbon atoms and the acid contains 3 to 10 carbon atoms. Examples of such monomers are the methyl, ethyl, n-propyl, isopropyl, n-butyl, isobutyl, sec-butyl, tert-butyl, amyl, hexyl, heptyl, 2-ethylhexyl, octyl, decyl, lauryl, stearyl, cyclohexyl, isobornyl, benzyl, beta-hydroxyethyl, beta-hydroxypropyl esters of acrylic, methacrylic, crotonic, ethacrylic, cinnamic, maleic, fumaric and itaconic acids. The monomers based on polycarboxylic acids can be mono- or diesters.

Examples of class C monomers are polymerizable unsaturated mono- and dicarboxylic acids containing 3 to 10 carbon atoms. Examples of such acids include acrylic, methacrylic, ethacrylic, crotonic, cinnamic, maleic, fumaric and itaconic acids.

Examples of class D monomers are polymerizable unsaturated nitriles, such as acrylonitrile, methacrylonitrile, ethacrylonitrile, crotonic nitrile and the like.

Examples of class E monomers are polymerizable unsaturated amides, alkylol amides and alkoxyalkyl amides, such as acrylamide, methacrylamide, diacetone acrylamide, N-methylol acrylamide, N-methylol methacrylamide, N-methoxymethyl acrylamide, butoxy-methyl acrylamide, and the like.

Vinyl aromatic monomers of Class F are exemplified by such compounds as styrene, α-methyl styrene, the various vinyl toluenes, vinyl naphthalene and the like.

Polymerizable alkenes of class G can be exemplified by such compounds as ethylene, propylene, isobutylene and the like, i.e., compounds which contain one ethylenic double bond and have 2 to 10 carbon atoms.

The class H alkadienes are conjugated dienes having 4 to 8 carbon atoms. Examples of such compounds are butadiene, isoprene, chloroprene and the like.

A preferred monomer for use in this invention is vinyl acetate, either polymerized alone or in combination with an alkyl acrylate, or a dialkyl maleate or fumarate, wherein the alkyl group contains 4 to 8 carbon atoms in the weight ratio of vinyl acetate to alkyl compound of 90:10 to 50:50. Also preferred are homopolymers and copolymers of alkyl acrylates and methacrylates, wherein the alkyl group contains 1 to 8 carbon atoms.

The amount of water which is used in order to prepare the emulsions can be varied over a wide range. Thus, 40 to 300 parts of water can be employed for each 100 parts of monomer or comonomer. Although a large excess of water can be used, it is undesirable to do so because the yield of polymer per unit volume of reaction vessel becomes unduly small. An amount of water less than 40 parts by weight is undesirable because the viscosity of the polymerizing mixture becomes too high to permit adequate agitation. A preferred range is 75 to 125 parts of water per 100 parts of monomer.

Wetting agents or surfactants are employed to expedite emulsification of the unsaturated material. Typical wetting agents include the well-known anionic and nonionic synthetic surfactants. Examples of anionic surfactants include alkyl aryl sodium sulfonates containing 8 to 18 carbon atoms in the alkyl radical such as dodecyl benzene sodium sulfonate and decyl benzene sodium sulfonate; sodium diisobutyl naphthalene sulfonate and sodium disulfonate of dibutyl phenyl phenol; alkyl sulfates such as sodium lauryl sulfate; alkyl aryl polyether sulfonates; alkyl aryl polyether surfates; and the sodium salt of dioctyl sulfo-succinate. Examples of nonionic surfactants which can be employed as emulsifying agents in the polymerizable monomer emulsion polymerization recipe include alkyl aryl polyether alcohols such as nonyl phenoxy polyoxyethylene ethanol; polyoxyethylene glycol esters of fatty acids; polyvoxyethylated fatty alcohols; polyoxyethylated fatty amides and block copolymers of polyoxypropylene and polyoxyethylene wherein the polyoxypropylene portion of the molecule has a molecular weight of at least 900 and the polyoxyethylene portion of the molecule is about 10 to 90 percent, by weight. Although a wide variety of surfactants can be employed, the exact surfactant or combination of surfactants to be used will depend upon the end properties desired and is readily apparent to those having ordinary skill in this art. The amount of surfactant that is used will vary depending upon the type surfactants, the monomers that are being polymerized, as well as other conditions. Generally, this amount will be from about 0.4 to about 4 percent, by weight, based on the total dispersion.

The monomer or monomers in this invention are polymerized by means of a catalytic amount of a conventional free radical polymerization catalyst or catalyst system (which can be referred to as an addition polymerization catalyst, a vinyl polymerization catalyst or a polymerization initiator). Preferably, although not necessarily, the polymerization catalyst is substantially water-soluble and soluble in the polymerization reaction mixture. Among such catalysts are inorganic peroxides such as hydrogen peroxide, alkali metal persulfates (e.g., sodium, potassium, and lithium persulfates) and ammonium persulfates, perphosphates and perborates, azonitriles, such as alpha, alpha-azobisisobutyronitrile, and redox systems, including such combinations as mixtures of hydrogen peroxide, tert-butyl hydroperoxide, or the like, and any of an iron salt, a titanous salt, zinc formaldehyde sulfoxylate or sodium formaldehyde sulfoxylate; ammonium or alkali metal persulfates, borates or perchlorates, together with an alkali metal bisulfite such as sodium metabisulfite; an alkali metal persulfate together with an arylphosphinic acid such as benzene phosphinic acid, and the like.

The amount of catalyst that is used is that amount sufficient to catalyze substantially complete polymerization of the monomers to polymers. Generally, this amount will be from about 0.05 to about 1 percent, by weight, based on the total weight of the dispersion.

An alkaline buffer, such as sodium bicarbonate, can be employed in order to control the pH of the system.

In carrying out the process of this invention, the alcoholysis or transesterification reaction is carried out utilizing a tri- or tetra- acrylate or methacrylate ester of a tri- or tetra- polyol. Examples of these materials include trimethylolpropane triacrylate, trimethylolpropane trimethacrylate, trimethylolethane triacrylate, trimethylolethane trimethacrylate, pentaerythritol tri- and tetra- acrylate and methacrylate, and the like. The second component used in carrying out the alcoholysis reacton is an alkyl di-, tri-, or tetra- polyol containing up to about 10 carbon atoms. Examples of such polyols include the glycols, such as ethylene glycol, propylene glycol, neopentyl glycol, hexanediol, butylene glycol, and the like; triols, such as trimethylol propane, trimethylolethane, and tetraols, such as pentaerythritol. The reaction ratio between the polyol and the acrylate or methacrylate ester is in the range of about 3 to about 1 moles of polyol per mole of polyacrylate or methacrylate ester, preferably about 1 to about 2 moles per mole.

Utilized as a transesterification catalyst is a material selected from titanium esters, titanium chelates, and aluminum, bismuth, barium, lead, zinc, copper, tin, chromium, calcium, antimony, cadmium or tin alcoholates, carboxylates, halides, oxides or alkyl oxides.

The catalyst is utilized at about the 0.5 to 5.0 percent, by weight, level, based upon the reactants. Generally the reaction is carried out by mixing the reactants and the catalyst, heating the mixture up to as high as 400° F., and holding at this temperature for from 1 to 4 hours.

Examples of the titanium esters include those compounds having the following formula:

wherein R' may be the same or different and contains 1–18 carbon atoms, preferably 1–4 carbon atoms. Examples of these compounds include tetraisopropyltitanate, tetrabutyl titanate, tetra 2-ethylhexyltitanate, tetrastearyltitanate and the like. The most preferred titanium ester is tetraisopropyltitanate.

The titanium chelates include tetraoctylene glycol titanate, triethanolamine titanate, titanium acetyl acetonate, and titanium lactate. The preferred chelate is triethanolamine titanate.

The term "alcoholate," as used in referring to the aluminum, bismuth, barium, calcium, zinc, copper, tin, chromium, antimony and cadmium compounds, means generally those materials of the formula:

wherein A is the metal cation, R is a carbon-containing moiety, having up to about 18 carbon atoms and no other substituents which interfere with the catalysis, and n is the number of ligands bonded to the cation.

The term "carboxylate" contemplates the materials of the formula:

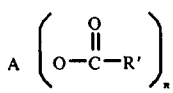

wherein R' is a carbon-containing moiety, having up to about 18 carbon atoms and no other substituents which interfere with the catalysis. The term "halides" contemplates the materials of the formula

wherein X is the particular halogen atom employed.

The term "alkyl oxide" contemplates materials of the formula

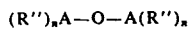

wherein R'' is a carbon-containing moiety having up to about 18 carbon atoms and no groups which interfere with the catalysis. Materials which contain oxide, carboxylate, alcoholate and/or halide moieties on a single cation are also contemplated.

Thus, for example, where tin is utilized, the catalyst may be selected from the group consisting of:

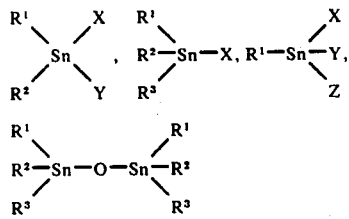

wherein $R^1$, $R^2$, and $R^3$ are the same or different and are 1–18 carbon atom alkyl or acyl groups, and wherein X, Y and Z are

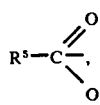

Cl—, BR—, I— or $OR^6$ wherein $R^5$ and $R^6$ are 1–18 carbon alkyl. Specific examples of , I— or $OR^6$ these materials include dibutyl tin dioxide, dibutyl tin dilaurate, dibutyl tin diacetate, aluminum isopropoxide, bismuth isopropoxide, calcium oxide, and the like. Likewise, depending upon the metal cation chosen, a compound similar to those set out for tin may also be employed. Of course, where less than four valance positions are available on the cation, fewer substituents on the cation will be allowed.

In carrying out the alcoholysis or transesterification reaction herein, it is preferred that a vinyl polymerization inhibitor be utilized. Examples of such materials include the quinones, such as hydroquinone and its monomethyl ether, the various phenols, p-tert-butylcatechol, p-methoxyphenol, 2,4-dichloro-6-nitrophenol, n-propyl gallate, di-tert-butyl-p-cresol, 2,2'-methylenebis(4-methyl-6-tert-butylphenol), 1-amino-7-naphthol, p-benzoquinone, 2,6-dichloro-p-benzoquinone, 2-amino-1,4-naphthoquinone, 3-aminoanthraquinone, diphenylamine, p-nitrosodimethylaniline, α and β -naphthylamine, nitrobenzene, phenothiazine, N-nitrosodimethylamine, hexamethylphosphoramide, n-dodecyl mercaptan, benzenethiol, 2,2-diphenyl-1-picrylhydrazyl (phenyl hydrazine), divinylacetylene, and various antimony and copper salts. Most preferred among the inhibitors are para-methoxyphenol, hydroquinone and its mono-methyl ether, phenothiazine and nitrobenzene. The inhibitors should be added to the reaction mixture in the range of about 50-1000 -parts per million parts by weight of reactant, preferably about 100–400 ppm.

The reaction is continued until the transesterification reaction is completed, as evidenced by maximum concentration of polyol mono-acrylate or methacrylate, as the case may be.

The protective colloids utilized in this invention are polymers of the alcoholysis products prepared above. The amount of protective colloid that is used will vary between about 0.2 to 2.0 percent, by weight, based on the total weight of the dispersion, preferably, between about 0.4 and 1.6 percent, by weight.

In carrying out the process of this invention, a polymer of the above alcoholysis product is dissolved or dispersed in the aqueous dispersing medium prior to the polymerization of the ethylenically unsaturated monomers. This polymer can be preformed prior to addition to the water, or it can be formed in situ in the water.

Preformed polymers of the above alcoholysis products can be polymerized in bulk, in water, or in a water-soluble or water-insoluble solvent. The polymer as a solution or in solid form is then dissolved or dispersed in the aqueous dispersion medium, i.e., the water in which the process of the invention is conducted. Preferably, the polymer of the alcoholysis product of this invention is added as an aqueous solution or as a solution in a water miscible organic solvent, since the polymer in this form is much easier to dissolve or disperse.

The polymers of the alcoholysis product of this invention are prepared by conventional means, utilizing catalytic amounts, i.e., 0.1 up to about 10 percent, by weight, of free radical catalysts, as previously described. Polymerization may be carried out in bulk, or the alcoholysis product may be added to the polymerization medium over a period of time ranging up to about 6 hours. Reaction temperatures depend to a great extent upon what solvent is utilized. Where water is involved, of course, the reaction temperatures must be below about 100° C. Where higher boiling solvents are utilized, higher temperatures may be employed.

Preferably, the alcoholysis product used as a protective colloid is polymerized in situ in the dispersing medium prior to the addition and polymerization of the ethylenically unsaturated monomers. In this method for conducting the process of this invention, the alcoholysis product is dissolved or dispersed in the aqueous dispersing medium, a free radical polymerization catalyst is added, and the monomer is polymerized. The aqueous dispersing medium can be just the water which is to be used for the total dispersion, but preferably it is the water plus surfactants and buffer if a buffer is used. The catalyst can be a portion of the catalyst which is used to form the polymeric dispersion or it can be a different catalyst. By modifying the amount and type of catalyst that is used, by the use of chain transfer agents, by varying the temperature and the method of adding the catalyst, the molecular weight of the hydroxyalkyl acrylate or methacrylate polymer can be varied. Such variations affect the particle size of the resulting dispersion, the lower the molecular weight of the protective colloid, the lower the particle size of the dispersion.

After the alcoholysis product is dissolved or dispersed in the dispersing medium, either by being added as a polymer or by being formed in situ, the dispersion polymerization is conducted by methods well known in the art. For example, all the monomers can be added and dispersed in the dispersing medium which contains, in addition to the water, surfactants and buffer if required. The catalyst can then be added either incrementally or all at once. Heating and agitation is then continued until the polymerization is completed. Preferably, the polymerization is conducted by adding the monomers and the catalyst incrementally to the dispersing medium, thereby controlling the rate of reaction. The reaction can be conducted at a temperature of 5° C. to 150° C., using pressure where necessary and, preferably, at a temperature of 50° to 90° C. The time for conducting the reaction will vary from about 2 hours to about 24 hours, depending upon the batch size and reaction conditions.

By utilizing the process of this invention, aqueous dispersions have been prepared which exhibit flow properties that vary between thixotropy and dilatancy. Flow properties have been classified as Newtonian flow, where the shearing stress is directly proportional to the shearing strain; pseudoplastic flow, where shear stress decreases with shear strain; and dilatant flow, where shear stress increases with shear strain. A thixotropic system may display many of the characteristics of pseudoplastic or dilatant flow curves except that a hysteresis loop is encountered if the shear rate is first increased and subsequently again decreased to zero from some maximum value. The flow characteristics of an aqueous dispersion can be described by its Thixotropic Index. A Thixotropic Index of 1 indicates that the polymer dispersion has Newtonian flow properties; a value below 1 indicates thixotropic flow properties; and above 1, dilatant flow properties.

The Thixotropic Index can be approximated by using a Brookfield viscometer to measure the viscosities of the dispersion at 25° C. The viscometer is run at its highest speed (200 RPM) and the largest spindle which will give a reading on the scale is selected. Using this spindle, the viscosity is recorded at speeds of 20, 40, 100 and 200 RPM, starting at the lowest and going to the highest speed. The Thixotropic Index is then calculated as follows:

$$\text{Thixotropic Index} = \frac{V_H}{V_L} = \frac{2V_{200} - V_{100}}{2V_{40} - V_{20}}$$

where $V_{200}$ is the viscosity at 200 RPM, etc. Accurate values for Thixotropic Index can only be obtained when a multipoint viscosity hysteresis loop is available on the test sample. These data can be obtained using such instruments as the Interchemical Rotational Viscometer. However, approximate values can be obtained using the Brookfield viscometer as described above.

By using the process of this invention, aqueous dispersions of synthetic polymers have been prepared which have Thixotropic Indices between about 0.2 to about 2.0. Dispersions having Thixotropic Indices which approach 1 when used as a paint have improved flow and levelling properties, but somewhat decreased sag properties.

In the following examples, all parts and percentages are by weight, unless otherwise specified.

EXAMPLE 1.

Into a reactor equipped with a reflux condenser, sampling device, mechanical agitator and thermometer were added 525 parts of trimethylolpropane triacrylate, 475 parts of trimethylolpropane, 5.0 parts of litharge, 0.2 parts of nitrobenzene, 1.0 parts of phenothiazine and 5.0 parts of water. The contents of the flask were heated under nitrogen to about 155° C. and held between 155° and 165° C. for about 1 hour and 15 minutes. The material was then filtered through two layers of cheese cloth.

EXAMPLE 2.

An 85 percent, by weight, 15 percent, by weight, vinyl acetate/butyl acrylate emulsion was prepared in a reactor equipped with a mechanical agitator, reflux condenser, sampling device, thermometer and addition funnels as follows: a pre-emulsion was prepared by mixing with rapid agitation, 100 parts of water, 457 parts of vinyl acetate, 81 parts of butyl acrylate, 27.6 parts of Igepal CA 897 (GAF Corporation), a nonionic octyl phenoxy polyethyleneoxy ethanol surfactant, in 70 percent aqueous solution, 3.1 parts of Triton X 200 (Rohm & Haas Co.), a sodium salt of alkyl aryl polyether sulfonate at 28 percent aqueous solution, anionic surfactant 9.8 parts of hexamethylol diacetone acrylamide, and 10.7 parts of pentaerythritol triacrylate. The preemulsion was added to the reactor (containing 260 parts of water) over 4.5 hours at a reaction temperature of about 65° C., along with a sodium persulfate catalyst solution (0.25 parts in 30 parts of water) mixed with 8.0 parts of trimethylolpropane monoacrylate as prepared in Example 1, and a solution of 0.68 parts of hydrazine dissolved in 58 parts of water.

EXAMPLE 3.

A 15 percent, by weight, 85 percent, by weight, butyl acrylate/vinyl acetate emulsion was prepared as follows: 331 parts of water were added to a reactor as described in Example 2, along with 1.0 parts of sodium bicarbonate, 8.5 parts of Igepal CO630, a liquid nonionic surfactant available from the G. A. F. Corporation, prepared based upon nonyl phenoxy polyethyleneoxy ethanol, and 25.6 parts of Igepal CO997, a nonionic surfactant (nonyl phenoxy polyethyleneoxy ethanol type, 70 percent concentration), and 9.3 parts of Polystep B-19, a sodium alkyl ether sulfate surfactant available from the Stepan Chemical Co., at 26 weight percent in water, and 8.0 parts of trimethylolpropane monoacrylate as prepared in Example 1. The catalyst utilized was a mixture of 1 part of sodium persulfate and 100 parts of water. The catalyst and monomer (362 parts vinyl acetate and 63.9 parts butyl acrylate) were mixed and added to the reactor over about 4 hours and 15 minutes at a temperature of about 73° C. The resulting product exhibited a viscosity of 390 cps, and when applied to a glass plate and allowed to dry, exhibited a dry, clear film having some grit.

EXAMPLE 4

The preceding example was repeated except that 16 parts of trimethylolpropane monoacrylate were utilized. The resulting product had a viscosity of 140 cps and the dry film was clear, glossy, and contained little grit.

EXAMPLE 5.

The preceding example was repeated except that 24 parts of trimethylolpropane monoacrylate as prepared in Example 1, were utilized. The resulting emulsion exhibited a solids content of 50.7 percent and a viscosity of 145cps. The dry film was clear, glossy and showed no grit.

EXAMPLE 6.

Example 3 was repeated, except that 50 parts of the catalyst were added initially to the reactor, and the remainder of the catalyst was added over 4 hours and 10 minutes. A product resulted having a viscosity of 80 cps. A dry film made from the emulsion was clear, and had a high gloss and no grit.

EXAMPLE 7.

A paint was prepared from Example 6 by predispersing 115 parts of water, 4.0 parts of Bentone LT thickener, 1.0 part of defoamer, and then adding and mixing until smooth with a Cowles blade, 4.0 parts of anti-fungicide, 5.0 parts of potassium tripolyphosphate (20 percent aqueous solution wetting agent), 5.0 parts Tamol 850 (Rohm & Haas Company sodium polycarboxylate 30 aqueous solution anionic surfactant), 2.5 parts of Triton CF10 (Rohm & Haas Company alkylaryl polyether nonionic surfactant), 24.5 parts of ethylene glycol, and 275 parts of titanium dioxide pigment. The resulting mixture was then let down with 37.2 parts of ethylene glycol, 2.0 parts of 28 percent aqueous ammonium hydroxide, 1.0 part of defoamer, and 545 parts of Example 6. The resulting product was applied to paper to a 1 mil film thickness and exhibited good flow and leveling.

What is claimed is:

1. In the process for preparing a stable dispersion of polymers of ethylenically unsaturated monomers which comprises reacting said monomers in water in the presence of a protective colloid and an anionic or nonionic surfactant or mixture thereof with a free radical polymerization catalyst under polymerization conditions, the improvement of which comprises using as the protective colloid a polymer of the transesterification product of 1 to about 3 moles of a 2-4 hydroxy group containing alcohol, and about 1 mole of a tri- or tetra-acrylate or methacrylate ester of a tri- or tetra- polyol.

2. The process of claim 1 wherein the protective colloid is present in the amount of about 0.2 to about 2 weight percent, based on the total weight of the dispersion.

3. The process of claim 2 wherein the amount of protective colloid is 0.4 to 1.6 weight percent.

4. The process of claim 1 wherein the transesterification product is the reaction product of trimethylolpropane and trimethylolpropane triacrylate.

5. The process of claim 1 wherein the transesterification product is the reaction product of pentaerythritol triacrylate and trimethylolpropane.

6. The process of claim 1 wherein the polymer of the transesterification product is preformed and added as a polymer to the water prior to the polymerization of the ethylenically unsaturated monomers.

7. The process of claim 1 wherein the transesterification product polymer is polymerized in situ in the water prior to the polymerization of the ethylenically unsaturated monomers.

8. The process of claim 1 wherein the ethylenically unsaturated monomer is vinyl acetate.

9. The process of claim 1 wherein the ethylenically unsaturated monomers are a mixture of vinyl acetate and an alkyl acrylate, dialkyl maleate, or dialkyl fumarate, wherein the alkyl group contains 4 to 8 carbon atoms, in the weight ratio of vinyl acetate to alkyl compound of 90:10 to 50:50.

10. The process of claim 9 wherein the alkyl acrylate is n-butyl acrylate.

11. The process of claim 1 wherein the ethylenically unsaturated monomers are alkyl acrylates or methacrylates or mixtures thereof, wherein the alkyl group contains from 1 to 8 carbon atoms.

* * * * *